United States Patent [19]

Haderle et al.

[11] Patent Number: 5,455,944
[45] Date of Patent: Oct. 3, 1995

[54] METHOD FOR MANAGING LOGGING AND LOCKING OF PAGE FREE SPACE INFORMATION IN A TRANSACTION PROCESSING SYSTEM

[75] Inventors: Donald J. Haderle, Los Gatos; Chandrasekaran Mohan, San Jose, both of Calif.

[73] Assignee: International Business Machines Corporation, Armonk, N.Y.

[21] Appl. No.: 31,774

[22] Filed: Mar. 15, 1993

[51] Int. Cl.⁶ .......................... G06F 17/30; G06F 12/00; G06F 12/16
[52] U.S. Cl. .................. 395/600; 364/DIG. 1; 395/182.17; 395/497.01; 395/419
[58] Field of Search .................................. 395/600, 425, 395/650

[56] References Cited

U.S. PATENT DOCUMENTS

| | | | |
|---|---|---|---|
| 4,507,751 | 3/1985 | Gawlick et al. | 395/575 |
| 4,604,694 | 8/1986 | Hough | 395/650 |
| 4,961,134 | 10/1990 | Crus et al. | 395/600 |
| 5,140,685 | 8/1992 | Sipple et al. | 395/425 |
| 5,193,162 | 3/1993 | Bordsen et al. | 395/425 |
| 5,222,235 | 6/1993 | Hintz et al. | 395/600 |
| 5,247,672 | 9/1993 | Mohan | 395/650 |
| 5,280,612 | 1/1994 | Lorie et al. | 395/600 |

OTHER PUBLICATIONS

Data Recovery In IBM Database 2, R. A. Crus, vol. 23, No. 2, 1984, pp. 178–188.

Research Report, Computer Science, C. Mohan, Aries: A transaction Recovery Method Supporting Fine–Granularity Locking and Partial Rollbacks Using Write–Ahead Logging, pp. 1–52 (Nov., 1990).

IBM Technical Disclosure Bulletin, No. 11, Method for Reserving Space Needed for "Rollback" actions, Lindsay, Mohan, Pirahest, 1986.

*Primary Examiner*—Thomas G. Black
*Assistant Examiner*—Hosain T. Alam
*Attorney, Agent, or Firm*—Baker, Maxham, Jester & Meador

[57] ABSTRACT

Database files containing records include pages called free space inventory pages (FSIPs) describing field space information relating to data pages. In a transaction processing system, the invention provides correct sequences for logging of updates to FSIPs when the updates are required by updates or UNDOs to data records. If, during operation to insert a data record to a data page, the FSIP containing free space information for the page indicates that the page is empty and there are no uncommitted deletes to the page, page I/O is avoided by formatting the page directly in a data buffer pool without reading the page from disk. During a cursor stability-level table scan with data record-level locking, excessive I/O and some record locking are avoided by using space reservation fields on an FSIP to ensure that there is no space reserved on the data page for a later undo of uncommitted data records deletes from the page.

5 Claims, 4 Drawing Sheets

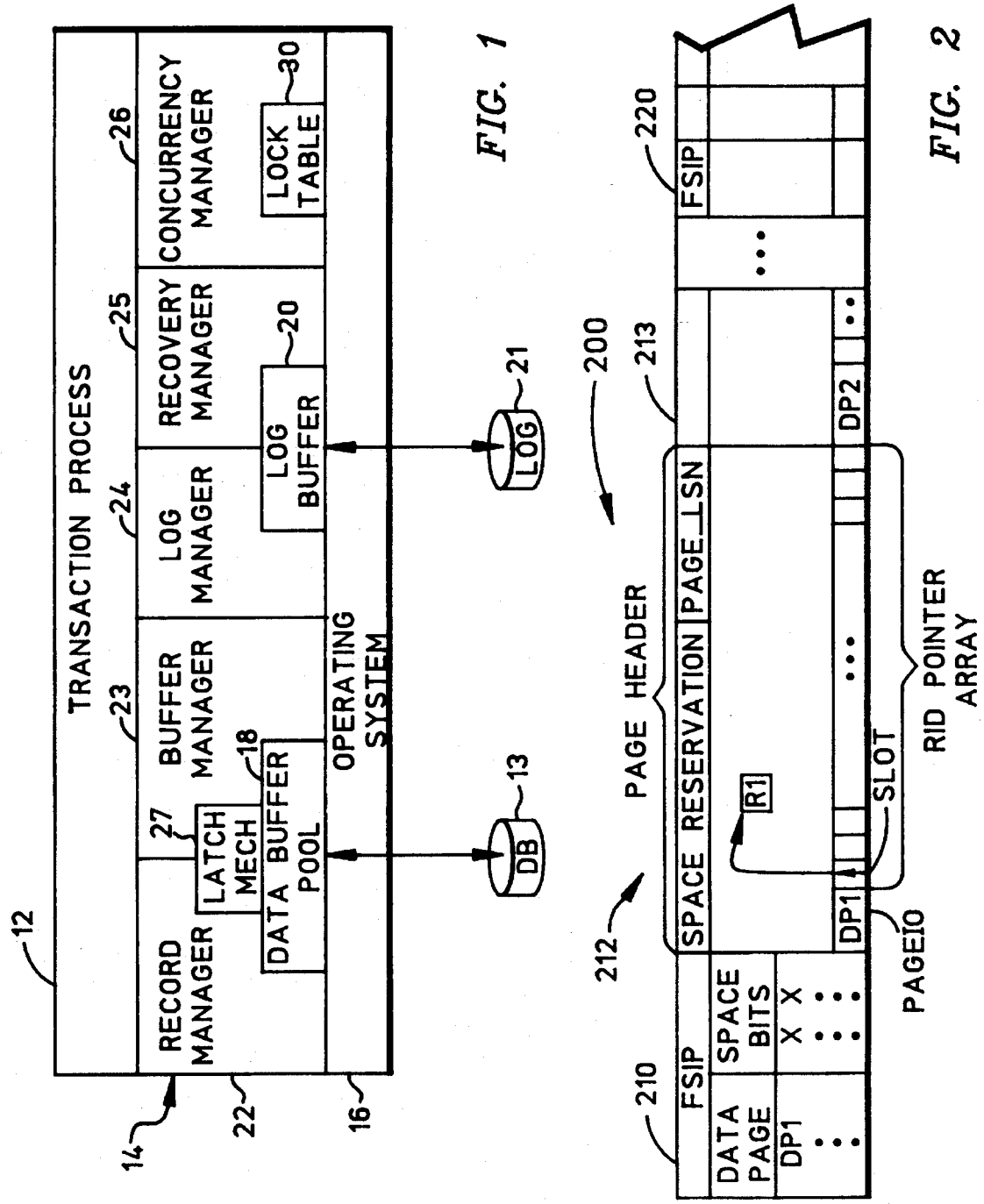

METHOD FOR MANAGING LOGGING AND LOCKING OF PAGE FREE SPACE INFORMATION IN A TRANSACTION PROCESSING SYSTEM

This invention relates to the management of logging and locking of data page free space information in a log-based, transaction processing system when a transaction updating a data page changes the free space available in the page. More particularly, the invention relates to establishing the logging sequences of updates to free space information and to data pages, to reduction of I/O activity during transaction operations, and to reduction of locking during table scan operations.

A prior art transaction processing system is described in detail in C. Mohan et al, "ARIES: A Transaction Recovery Method Supporting Fine-granularity Locking and Partial Rollbacks using Write-ahead Logging", IBM Research Report RJ 6649, IBM Almaden Research Center, January, 1989, revised, November, 1990. This report is also available in reprints of the identically-named article in ACM Transactions on Database Systems, March 1992. Methods of operating this system are described in detail in the following U.S. Patent Applications, which are assigned to the assignee of this application, and incorporated herein by reference:

1. D. Haderle et al, U.S. patent application Ser. No. 07/963,933, filed Oct. 19, 1992, which is a continuation of Ser. No. 07/758,440, filed Sep. 5, 1991; and
2. C. Mohan, U.S. patent application Ser. No. 07/480,700, filed Feb. 15, 1990, U.S. Pat. No. 5,247,672 issued on Sept. 21, 1993.

The prior art concerning transaction processing systems which use logs to support normal backout processing and system recovery and restart embraces the following references:

1. Gawlick et al, U.S. Pat. No. 4,507,751, "METHOD AND APPARATUS FOR LOGGING JOURNAL DATA USING A LOG WRITE-AHEAD DATA SET", issued Mar. 26, 1985;
2. Crus et al, U.S. Pat. No. 4,961,134, "METHOD FOR MINIMIZING LOCKING AND READING IN A SEGMENTED STORAGE SPACE", issued Oct. 2, 1990;
3. R. A. Crus, "Data Recovery in IBM DB2", IBM Systems Journal, Vol. V, No. 2, 1984, pp. 178–188; and
4. B. G. Lindsay et al "Method for Reserving Space Needed for Rollback Actions", IBM Technical Disclosure Bulletin, No. 11, 1986, pp. 2743–2746.

Of the above references, Gawlick discloses write-ahead logging. Crus et al discloses tracking of free page space during transaction operations, while the Crus reference describes the recovery log of a specific transaction management system (IBM's DB2 system). The IBM Technical Disclosure Bulletin article warns that when uncommitted transactions release storage space which they have reserved, the space cannot be consumed by other transactions until the reserving transaction is committed because of the possibility that the transaction may be undone.

As background, transaction processing concerns a logical unit of work called a "transaction" which encloses a sequence of operations that transforms a consistent state of a recoverable resource into another consistent state. The transaction processing system supports the property of "atomicity" in that it guarantees that if a transaction executes some updates of a recoverable data resource, and a failure occurs before the transaction reaches its normal termination or some interim point of consistency, those updates will be undone.

A transaction is bracketed in a transaction processing system between a BEGIN operation and either a COMMIT or ABORT operation. Atomicity is guaranteed by the COMMIT and ABORT operations. The COMMIT operation guarantees that a new point of consistency has been reached and all updates made by a transaction have been made permanent. The ABORT operation signifies the occurrence of a fault and guarantees that all changes made to the recoverable resource by the aborted transaction have been removed and a resource has been restored the state it was in when the aborted transaction began. A transaction processing system has the capacity to roll back (UNDO) uncompleted transactions by removing the effects of any updates made up to the time the transaction was aborted.

The transaction recovery guarantee must also be effective when the transaction processing system itself fails. In this regard, the system must be able to remember, when a system failure occurs, what transactions were in progress, and their actions up to the time of failure, so that they can be properly reflected in the recoverable resource when the system is restarted.

To meet the atomicity and recovery guarantees, a transaction processing system maintains a log in non-volatile storage. The system records in the log the actions of a transaction which cause changes to data in the recoverable resource. The log provides the information necessary to UNDO updates made by failed transactions and to REDO updates made by committed transactions in the face of system failure which occurs before those updates are reflected in the disk version of the database.

Log information is typically in the form of a sequence of log records, wherein each log record is assigned a unique log sequence number ("LSN") at the time the record is written to the log. Typically, LSNs are assigned in a monotonically increasing sequence. A log record for an update operation contains at least UNDO and REDO portions. The UNDO portion includes, for example, the value of an updated data record before the record was updated, while the REDO portion represents the value of the record after updating. Thus, if the transaction is aborted, the effects of an update on a data object can be removed by changing the record's value to The UNDO value during UNDO processing. Relatedly, the effects of a committed transaction whose updates fail to reach the recoverable resource on disk before a system failure occurred can be reflected in the system by use of the REDO portions of the transaction's log records.

Typically, a transaction log includes an active portion that consists of a set of log buffers in computer main memory and preallocated storage space in a non-volatile, on-line storage facility such as a direct access storage device (DASD). Periodically, log buffers are written to the non-volatile storage device.

Recoverable data in non-volatile storage ("stable" or "disk" storage) and in volatile storage (such as computer "main" or "real" or "virtual" memory) is divided into pages. Each page typically holds the equivalent of several typewritten pages. Usually a page is subdivided into records, which are the smallest units of recoverable resource on which a transaction typically operates. When a transaction needs to access certain data, it provides a reference to the record containing the data, a page containing the data record is identified, and the page is transferred from stable storage into a buffer in main memory. If the data in the record is updated by the transaction, the updated page is transferred back to stable storage from the buffer at a later time.

Locking is used to synchronize the access of simultaneously executing transactions to shared data, and in particular is used to prevent concurrent transactions from inconsistently modifying the same data. Appropriate use of locking can guarantee a transaction that the data that it reads is in a consistent state and that the data does not contain uncommitted updates of other transactions.

Systems which use page-level locking cannot lock less than a whole page, even if a transaction obtaining the lock only needs to access one of the records on a page. Locking at a finer granularity such as record-level locking can reduce contention between concurrent transactions, but imposes greater processing overhead and expense. In this regard, locking is time consuming ("expensive" in technical terms), and, therefore, slows the processing of transactions.

The speed with which a transaction processing system operates is also affected by the need to exchange data between main memory and stable storage. Typically, data is exchanged in standard units of transfer which have a prescribed format and size. A page is a typical unit of transfer. A database management system is organized and operated to minimize the number of transfers which must take place between main memory and stable storage. A common strategy for minimizing such exchanges is to maximize the number of related pages transferred into the main memory in one input-output (I/O) operation. Thus, when a page is transferred into main memory in response to a transaction request for a data record, a number of other related pages are transferred at the same time because of the possibility that the transaction will require reference to other records on the related pages.

Typically, a database is organized logically as a set of files, in which each file consists of a sequence of records. Since the files are logically organized on the basis of defined characteristics, the records of a file are related by those characteristics, as are the pages which contain those records. Thus, when a file is accessed by a transaction, a set of related pages may be transferred to main memory from stable storage.

Typically, each file containing records has a few pages called free space inventory pages (FSIPs). Each FSIP describes space information relating to many data pages or index pages. When a transaction inserts a record into a page, possibly based on information obtained from a clustering index about the location of other records with the same clustering key value (i.e., a common property or characteristic) as that of the new record, one or more FSIPs may be consulted to identify a data page with enough free space in it for inserting the new record. Usually, an FSIP keeps only approximate information to make sure that not every space-releasing or space-consuming operation performed by some transaction on a data page requires an update to the space information in the corresponding FSIP. To avoid special handling of the recovery of the FSIPs during UNDO and REDO operations, and also to provide recovery independence, updates to the FSIPs must be logged in a manner that is consistent with the related REDO, UNDO, and RECOVERY operations.

Ideally, the information tracked in FSIPs should be reliable enough to determine whether a page is totally empty. When such a page is indicated by an FSIP, an input/output (I/O) operation to read the empty page into main memory from stable storage can be avoided provided it is known that no uncommitted deleted records exist on that page. A technique for that purpose was disclosed in the above-cited U.S. Pat. No. 4,961,134. However, that method works only when the smallest granularity of locking is a page. A manifest need exists to provide a guarantee that an empty page indication in an FSIP is valid against uncommitted deletes to the page in a system employing record-level locking.

Last, in a transaction processing system employing record-level locking and supporting database table scans which are isolated to the level of cursor stability, there is currently no way of avoiding locking every possible record space on a page in order to eliminate the possibility that any uncommitted delete may occupy such spaces before the scan is completed. It would be very useful in such operations to use space reservation information for a page to determine which empty record spaces may be safely skipped without locking them.

SUMMARY OF THE INVENTION

The invention is practiced in a computer system executing a database management system program which performs operations on data stored in a database in response to transaction requests, the database having a structure in which data records are contained in pages and the pages are organized into groups where each group includes a free space inventory page (FSIP) containing space inventory records, each space inventory record indicating an amount of free space in a respective page of the group, the computer system including a non-volatile data storage facility, a main memory, an operating system facility for transferring data between the storage facility and the main memory, the database management program including a record manager for managing allocation of space in the pages, a log, and a log manager for entering records of updates to the data of the database into the log. In this context, the invention relates to a method, executed by the computer system, for updating free space inventory pages, and including the steps of:

entering a data page and an FSIP into the main memory;

updating the data page in the main memory and entering a record of the data page update into the log; followed by, determining whether the update to the data page requires changing a space inventory record for the data page in the FSIP; and if required, updating the space inventory record and entering a REDO record of the update to the space inventory record into the log.

In the event that UNDO processing of an update to a data page requires changing a space inventory record, the invention also includes a method executed by the computer system for updating free space inventory pages during UNDO processing of an update to a data page, the method including the steps of:

entering a data page and FSIP into the main memory;

UNDOING an update to the data page; followed by, if the UNDOING step requires changing a space inventory record for the data page in the FSIP, performing the update to the space inventory in the FSIP and entering a REDO record of the FSIP update into the log; and entering a record of the UNDOING step in the log.

The above-recited computer system also executes a method for inserting a record to a data page, which includes the steps of:

entering an FSIP into the main memory;

receiving a transaction request for insertion of a data record into a data page for which a space inventory record exists in the FSIP;

if the space inventory record indicates that the data page is empty, and there are no pending uncommitted deletions of data records from the data page, formatting the data page in the main memory and inserting the data record into the data page; otherwise, entering the data page into the main memory from the data storage apparatus and inserting the data record into the data page.

BRIEF DESCRIPTION OF THE DRAWINGS

In order that the invention may be fully understood, a preferred embodiment thereof will now be described by way of example only, with reference to the accompanying drawings, in which:

FIG. 1 is a block diagram illustrating the logical architecture of a transaction processing system of the database management type in which the invention may be practiced;

FIG. 2 is a schematic diagram illustrating a structure for recoverable data in the database system of FIG. 1;

DETAILED DESCRIPTION OF THE PREFERRED EMBODIMENT

Figure 3:
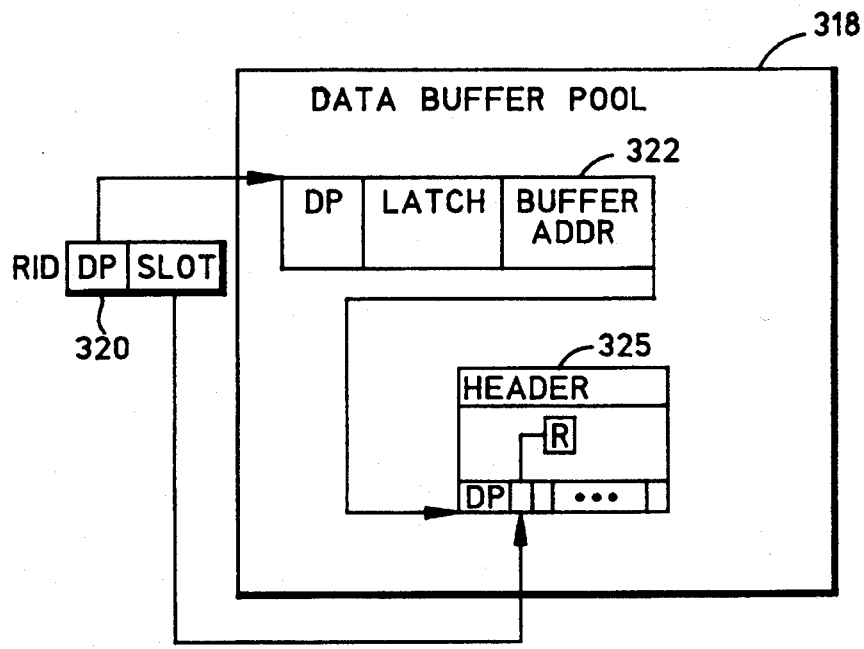
FIG. 3 is a schematic diagram illustrating the structure of the database buffer in the main memory of the system of FIG. 1.

FIG. 1 illustrates logical architecture of a transaction processing system in the form of a database system with a database management program component. In this architecture, a transaction process 12 may be an application program whose execution supports the concurrent, overlapping execution of a plurality of transactions. The transactions executed by the process 12 are provided with access to a database 13 through a database management system program 14 (DBMS) and a computer operating system 16 providing input/output (I/O) services. A data buffer pool 18 is allocated to the DBMS 14 from computer main memory for data with respect to the database 13 which may be stored on a stable storage facility, such as DASD. The DBMS 14 is also allocated a log buffer 20 from main memory for storage of log records with respect to a transaction system log 21 stored on a stable storage facility, such as a DASD.

The DBMS 14 embraces a number of functions which can be understood with reference to available products, such as IBM's well-known DB2 product. The DBMS 14 includes a record manager 22, a buffer manager 23, a log manager 24, a recovery manager 25, and a concurrency manager 26. The record manager 22 manages the data structures and storage space of the database 13. The buffer manager 23 receives calls for data resources from the record manager 22 and operates in connection with the I/O services of the operating system 16 to transfer data resources between the buffer pool 18 and the database 13. The latch mechanism 27 is available to the record manager 22 for latching data resources in the data buffer pool 18 during processing. A log manager 24 creates the log record sequences which underpin the atomicity and recovery properties with respect to the recoverable data resources in the database 13, assembling those sequences as numbered log records in the log buffer 20 and moving them by way of the I/O services of the operating system 16 into the log 21. The recovery manager 25 utilizes log information to ensure database consistency. The concurrency manager 26 implements locking procedures by means of a lock table 30.

FIG. 2 illustrates the logical structure of recoverable data stored in the database 13. This structure is explained in greater detail in the above-cited U.S. Pat. No. 4,961,134. The database 13 exhibits a segmented logical structure in which each segment corresponds to a page, wherein a page is the basic unit of transfer between the buffer pool 18 and the stable storage wherein the database 13 resides. In FIG. 2, a sequence of pages 200 includes a plurality of pages in which data pages (DP) store actual data in the form of data records. Data pages are partitioned into groups, each group including set of consecutively-numbered data pages. In addition to a set of consecutively-numbered data pages, a group includes a free space inventory page (FSIP) which contains, for each data page in the group, space inventory information. In FIG. 2, a group of pages in the sequence 200 includes an FSIP 210 listing all of the data pages in its group and providing, for each listed data page, space inventory information in the form of space bits. The space inventory information indicates how much unused ("free") space is available in the page for receipt of data records. During transaction operations in which data records are updated, inserted into, or deleted from, data pages, the relevant space inventory information for those data pages is processed by the record manager 22 in the FSIP for the group containing the data pages.

In FIG. 2, a logical architecture applicable to all data pages in the database is shown for a data page 212. The data page 212 includes a multi-field page header, a page identification (ID) field, and a sequence of fields called the record identification (RID) pointer array. Each field of the array is called an "element" or a "slot" and has a unique number. A slot in the RID pointer array contains either a '0' or a pointer to a location in the data page 212 where a data record such as the data record 213 is located. Assuming that the DBMS 14 is capable of uniquely naming each data page in the database 13, every record in the database can be uniquely identified by the concatenation of the identity of the data page on which it is stored with the slot number which points to it.

The page header includes information regarding reservation of space on the page and a field (LSN) for entry of a log sequence number (Page_LSN) which equals the log sequence number assigned to the last update to that page which has been entered into the log. When an updated page is transferred from the data buffer pool 18 back to the database 13, the Page_LSN is transferred with it. Then, during recovery, the recovery manager 25 can use that Page_LSN to correctly choose those data records whose updates need to be recovered for the page. This is fully laid out in the incorporated U.S. patent application Ser. No. 07/480,700, U.S. Pat. No. 5,247,672. The space reservation information in the page header can be understood with reference to the above-cited IBM Technical Disclosure Bulletin article by Lindsay et al.

It is the function of the record manager 22 to keep track of and update the space reservation information and Page_LSN fields of page headers when pages are being updated in the data buffer pool 18.

In FIG. 3, a data buffer pool 318, corresponding essentially to the data buffer pool 18 of FIG. 1, is illustrated. The data buffer pool 318 comprises a section of computer main memory which is allocated to the DBMS 14 for buffering of data. The data buffer pool 318 may typically contain partial or entire page groups together with the relevant FSIPs. When residing in the data buffer pool 318, each page is referred to as a "buffer" and has associated with it a buffer control block (BCB). Assume that a transaction requires a record identified by a record identification (RID) 320 consisting of a concatenation of the identity of the data page (DP) on which the record is stored, with the slot number (SLOT) containing a pointer to the data record in the data page. When the record is initially requested, the page ID is passed to the buffer manager. If the data page containing the record is not in the data buffer pool, the buffer manager initiates an I/O operation conducted by the operating system services to retrieve a group of pages including the identified page from the database. As each page of the group is brought into the data buffer pool 318, a buffer control block (BCB) for the page is created. One such buffer control block is indicated by reference numeral 322 in FIG. 3 and includes a field (DP) containing the identification of the data page. The BCB 322 also includes a Latch field which is set when a page is latched for a particular operation and reset otherwise. A BUFFER ADDR field provides a buffer address in the data buffer pool 318 where the page 325 identified in the DP field is stored.

Returning to FIG. 1, the concurrency manager 26 includes lock management functions which maintain the lock table 30 and process lock requests on a first-in-first-out (FIFO) basis among competing transactions. The lock functions are described essentially in the incorporated U.S. patent application 07/480,700, U.S. Pat. No. 5,247,672 and in the Lindsay et al article. It is asserted that the lock management functions, while returning from processing a lock-request call, will indicate whether a lock was already being held by the requesting transaction at the time of the current call and, if the lock was held, then the mode in which the lock was held. Since it is assumed that the DBMS 14 of FIG. 1 employs fine-granularity locking, it is possible for locks listed in the lock table 30 to apply to sub-page level objects. In particular, it is contemplated that records may be locked, as may be the fields of the page header and the slots of a page RID pointer array.

LOGGING UPDATES TO FREE SPACE INVENTORY PAGES

In the above-cited Research Report by Mohan et al, the risk of failing to synchronize the logging of changes to FSIPs to data page updates is described. The risk arises from the fact that the space inventory bits provide only approximate information respecting free space available on pages. For example, the bits might have the following significance:

| SPACE INVENTORY BIT STATE | FREE SPACE AVAILABLE |
| --- | --- |
| 00 | empty |
| 01 | 75%<free space<100% |
| 10 | 50%<free space<75% |
| 11 | free space<50% |

In this space inventory coding scheme, the bit state '00' indicates that the page is empty; that is, that the amount of free space is equal to 100% of the space available on the page. Bit states '01' and '10' indicate that increasingly less free space is available on the data page. The bit state '11' indicates that the data page is almost full. Thus, the FSIP keeps only approximate information bits in order to ensure that not every space releasing or space consuming operation to a data page requires an update to the space information in the corresponding FSIP. Nonetheless, to avoid special handling of the recovery of the FSIPs during REDO and UNDO processing, and also to provide recovery independence, updates to the FSIPs must be logged.

Consider an example where transaction T1 inserts a record to a page, changing it from 47% full to 53% full. This would cause an update to its space bits from '10' to '11'. Later, concurrent transaction T2 might cause the space to go to 61% full, which does not require an update to the space bits for the page in its FSIP. Now, if transaction T1 were to roll back, the space would change to 55% full, which would not cause an update to the space bits to the page. However, if T1 had written its FSIP change log record as a REDO/UNDO record, the roll back of T1 would utilize the UNDO portion of the record, cause the FSIP entry to the page to change to '11', which would be incorrect, given the current state of the data page after the update by T2. However, if the changes to the FSIP are logged as REDO-only records and if FSIP updates are rolled back by use of the logical undo procedure described in the Mohan et al reference, this situation can be avoided. Essentially, while undoing a data page update, the DBMS must determine whether the UNDO operation causes the space information record for the undone page to change state and, if it does cause a change, then update the FSIP and write a REDO in a log record which describes the change the FSIP. The invention provides for ordered logging of an FSIP's update with respect to logging of the data page update which triggered it. The proper ordering of the updates during forward processing is given in Table IA as follows.

TABLE IA: Pseudocode for updating FSIP during forward processing
X latch data page
Perform data page update and log it
Check if FSIP update is needed
If yes then
    If necessary, latch appropriate FSIP
    Perform the FSIP update, log it using redo-only log record
    Release FSIP latch, if held
Unlatch data page It is observed that, during forward processing, the logging of the data page's update is done before the update, if any, to the FSIP if logged. Reversing the order could cause ambiguity in the recoverable resource if a failure were to occur to the system after logging the FSIP update, but before logging the data page update. In this circumstance, during restart, the FSIP update would not be undone due to the logging of that update using a REDO-only log record. Such a scenario could result in the FSIP indicating that a data page is empty when, in fact, it is not. This could cause a table scan to skip a data page, thereby providing incorrect results.

During UNDO processing under normal (transaction roll back) and restart conditions, FSIP updates resulting from the UNDO of the data page update are, again, logged using a REDO-only log record. Pseudocode for UNDO processing according to the invention is given in
    TABLE IB as follows:
TABLE IB: Pseudocode for updating FSIP during UNDO processing
X latch data page
Perform data page update
Check if FSIP update is needed
If yes then
    If necessary, latch appropriate FSIP
    Perform the FSIP update, log it using redo-only log record
    Release FSIP latch, if held
Log data page update (using a compensation log record)
Unlatch data page As reference to Table IB will confirm, during UNDO processing, the logging of the data page's update is done after that of the FSIP's update, if any. The opposite order might cause problems if a failure were to happen after the logging of the data page update, but before logging of the FSIP update. In this case, during restart, the FSIP update would not be performed due to the logging of the data page update using a compensation log record (CLR), which will not be undone. This could result in the FSIP indicating that a data page is empty and, in fact, it is not, with consequences as described above. A compensation log record is a REDO-only log record written to describe an UNDO of a log record and containing a pointer to the predecessor of the just-undone log record. CLRs are described in detail in the Mohan et al report.

I/O AVOIDANCE DURING RECORD INSERTION USING FSIP SPACE INVENTORY DATA

The invention also includes a procedure using an FSIP to detect an empty page during a record insert operation when a transaction is in forward processing. This procedure avoids having to invoke the I/O services to read the empty page from non-volatile storage. If the page does not have to be read, then a buffer slot can be allocated in the data buffer pool for that page and formatted as needed. Thus, one synchronous I/O operation can be saved, which can lead to less load on the I/O services, saving CPU overhead of initiating an I/O operation and causing a process switch. Improved response time and reduced lock hold time will also result.

The procedure accounts for the possibility that there may be some uncommitted deletes on a page whose FSIP says that it is empty. In this case, the version of the page stored in DASD could not be ignored and the page would have to be read to the data buffer pool to see if there is any unreserved free space. This procedure presupposes the existence of a "reservation lock" which is used to determine whether an FSIP indication that a data page is empty actually reflects page's committed state. Such a lock is disclosed in the cited IBM Technical Disclosure Bulletin article.

The "reservation lock" is requested by the record manager on behalf of a transaction which seeks to reserve space which it has freed during a delete operation against the possibility that an UNDO of the transaction may require reinsertion of deleted data into the reserved space. The lock manager, while returning from processing any lock request call, will indicate whether the lock was already being held by the transaction on whose behalf the lock is requested at the time of the current call, and, if the lock was held, the mode in which the lock was held. The lock manager will also indicate whether the lock is currently held by any other transaction.

The procedure is illustrated in the pseudocode of Table II as follows:
TABLE II: Pseudocode for record insert using FSIP information
FSIP says data page K is empty
Request conditional X (reservation) lock on K
If lock granted and lock not already held by current transition Then
  If FSIP entry still says K is empty Then
    Allocate an empty slot in buffer pool for K
    Format slot and log formatting action
    Follow normal insert logic (insert, log data and FSIP changes, . . . )
    Release lock on K
  Else
    Release lock on K
    Follow normal insert logic (read page, check reservation info, . . . )
Else
  If lock granted then release lock on K
  Follow normal insert logic (read page, check reservation info . . . )

Initially, it is asserted that a transaction has requested insert of a data record into a file, resulting in a call to the buffer manager to fix an identified page in the data buffer pool. It is further assumed that the FSIP containing the space inventory information for the called page is in the data buffer pool and that it indicates that the page (data page K) is empty. At this point, the record manager requests a conditional X-mode reservation lock used for reserving space on data page K. This lock names the reservation fields in the page header as the objects to be locked. If the lock manager responds by granting the lock, it also provides an indication of whether it is being held for the current transaction. If the lock has previously been requested for the current transaction, then the conclusion is the current transaction has uncommitted deletes on data page K. If the lock is granted and it is not already held for the current transaction, then if the FSIP space inventory bits for data page K indicate that the page is still empty, an empty buffer slot will be allocated in the data buffer pool, the slot will be formatted for data page K, the formatting action will be logged, and a normal INSERT of the data record will be made into the page. The reservation lock will then be released.

On the other hand, if another transaction has updated the data page and caused a change in the space reservation information for the page in the FSIP, the reservation lock will be released and normal insert logic will be followed, prefaced by a reading of the page from non-volatile storage to the data buffer pool in main memory. Similarly, if the lock is granted and the grant response indicates that the lock is already held by the current transaction, the assumption is that there may be uncommitted deletes which will have to be placed back into the page if the transaction is rolled back. In this case, normal insert logic is followed including reading the page to main memory from non-volatile storage.

LOCK AND I/O REDUCTION DURING TABLE SCAN USING FSIP INVENTORY DATA

The invention also includes a procedure using an FSIP to detect an empty page during a table scan which is being performed at the cursor stability (CS) level when record locking in effect. A cursor stability-level table scan is an operation in which sequenced data records in a table are successively read. The operation may update data records, and any data modified during the scan is held by an exclusive (X) lock until the end of the transaction. However, any data records read during the scan are read under shared (S) locks which are maintained for only so long as the scan cursor is positioned on a data record being read. Thus, the scan procedure obtains and releases S locks on data records being read for so long as the scan persists. For example, having read the second data record, the transaction may lock the third data record and surrender the lock on the second, or may surrender the lock on the second and request the lock on the third. The shared lock on data records is stable in that the lock will be maintained for so long as the cursor dwells on that data record.

In such an operation, if the data page in a sequence of data pages containing a table being scanned is empty, it would be preferable not to have to transfer the page into the data buffer pool from stable storage. In this case, it would be desirable to simply go on to the next page in the sequence. Again, an FSIP can be consulted to determine whether the page is empty. However, there must still be a guarantee that there is no concurrent transaction which has made uncommitted deletes from the page which might be restored if the transaction is aborted.

In the case where an I/O transfer of the page in the database into the data buffer pool cannot be avoided, it would be desirable to avoid locking empty slots in the RID pointer array of the page if there were a guarantee that any empty slot did not represent space reserved by an uncommitted transaction for a possible roll back of a delete operation. Table III illustrates, in pseudocode, a procedure which provides such guarantees.

TABLE III

Pseudocode for table scanning using FSIP information

If the FSIP entry for data page P says that P is empty Then
    request (reservation) instant S lock on P     /*see Lindsay et al*/
    If the FSIP entry still says that the page is empty Then
        skip page, go to FSIP and process entry for next data page
                              /*note that I may have uncommitted*/
                        /*deletes on this empty page    */
Read and S latch P
If page LSN < Commit_LSN Then     /*no uncommitted updates on page */
    Note that there is no reserved space on page
If there is reserved space on the page and there may be other reserver
        transactions Then     /*see Lindsay et al*/
    request instant S (reservation) lock on P
                                  /*use usual logic for deadlock avoidance*/
    If I did not hold reservation lock before Then
        Note that there is no reserved space on page
    Else remember that I am the sole reserver on the page
If there is no reserved space on the page or I am the only reserver Then
    Lock only nonempty elements of the RID pointer array and read the corresponding
        records (usual logic used to avoid deadlocks and to read one record at a time)
Else lock all elements of the RID pointer array and read the corresponding
    records (usual logic used to avoid deadlocks and to read one record at a time)
Unlatch P In Table III it is assumed that a table scan at the cursor stability level has been initiated by the record manager. During the table scan, the record manager will provide the buffer manager with a sequence of data page IDs for data pages containing data records of the table being scanned. It is assumed that the database is organized so that the table data records are contained in data pages that are clustered into a sequential set of data pages. It is further assumed that the record manager, given knowledge of the set of data pages, can determine the FSIP or FSIPs for the set of data pages. When the scan is initiated, the record manager keeps track of the current location of the scan, ensuring that the relevant FSIP is in the data buffer pool for reference in the procedure embodied in Table III.

Assume in Table III that a table scan at the cursor stability level has been initiated and that the relevant FSIP for the next data page P to be considered in the scan is already in the data buffer pool. When the record manager determines that the data page P is the next data page to be scanned, it consults the data page's space inventory bits in the FSIP. If the bits indicate that P is empty, the record manager requests an "instant" S-mode reservation lock on data page P. If the lock is attainable with no holders, then it can be safely concluded that no transaction has reserved space on the page against the possibility of undoing the delete operation. Thus, if the instant S reservation lock is available with no holders and the FSIP entry still indicates the data page P is empty, the page can be safely skipped, avoiding the need to invoke the I/O services to bring the page into the data buffer pool, and the procedure can restart for the next page. Otherwise, the page must be read into the data buffer pool through I/O services in the operating system. The page is latched in the buffer pool.

After data page P has been entered into the buffer pool and latched, two tests are invoked to determine whether an uncommitted transaction may have reserved space on the page for undoing a delete operation. If this possibility exists, the conservative course is to obtain locks for all slots of the RID pointer array, including those with zero values. This, of course, is expensive in terms of time. The expense can be reduced if the record manager can be guaranteed that there is no uncommitted transaction possibly reserving space in data page P for undoing a delete operation.

In the first test, the value in the Page_LSN field of data page P is compared to a value in a Commit_LSN field maintained in computer main memory by the DBMS. The Commit_LSN value may be a global value identifying the oldest uncommitted transaction accessing any data in the database, or it may be a value identifying the oldest uncommitted transaction that has modified particular subsets of the database (such as files, tables, and indexes) containing data page P. In this test, if the Page_LSN value is less than the Commit_LSN value, the conclusion is that all uncommitted transactions are too "young" to have any uncommitted updates on data page P. In this case, the procedure sets the page's space reservation fields to indicate that there is no reserved space on the page. In all cases, if there is no reserved space, empty slots of the RID pointer array may be skipped in the scan. The second test is directed to determining whether, if there may be reserved space on the page, the space may have been reserved on behalf of the transaction executing the scan or another transaction. If the transaction executing the scan is the only reserver, the empty slots may be skipped. Otherwise, if there are other potential reserver transactions, then all slots of the RID pointer array must be locked for the scan. For the second test, the assumption is made that there is possibly reserved space on the data page. An instant lock on the space reservation fields in the page header is requested. The lock is requested in shared (S) mode. Again, the lock manager responds to a request for an instant S lock on the reservation fields by reporting whether the lock is also being held (shared) on behalf of any other transactions. If the response indicates that the lock is not being held on behalf of any transaction ("I did not hold the reservation lock before") then the conclusion is made that there is no reserved space on the page. Alternatively, if the only other request for the lock is on behalf of the transaction for which the present request is made ("I am the sole reserver on the page"), then the record manager concludes that there is no possibility of a non-empty slot in the RID pointer array representing space which is reserved by another transaction for an uncommitted delete. In this case, only the non-empty slots in the RID pointer array have to be locked in order to read the corresponding data records.

INDUSTRIAL APPLICATION

Figure 4A:
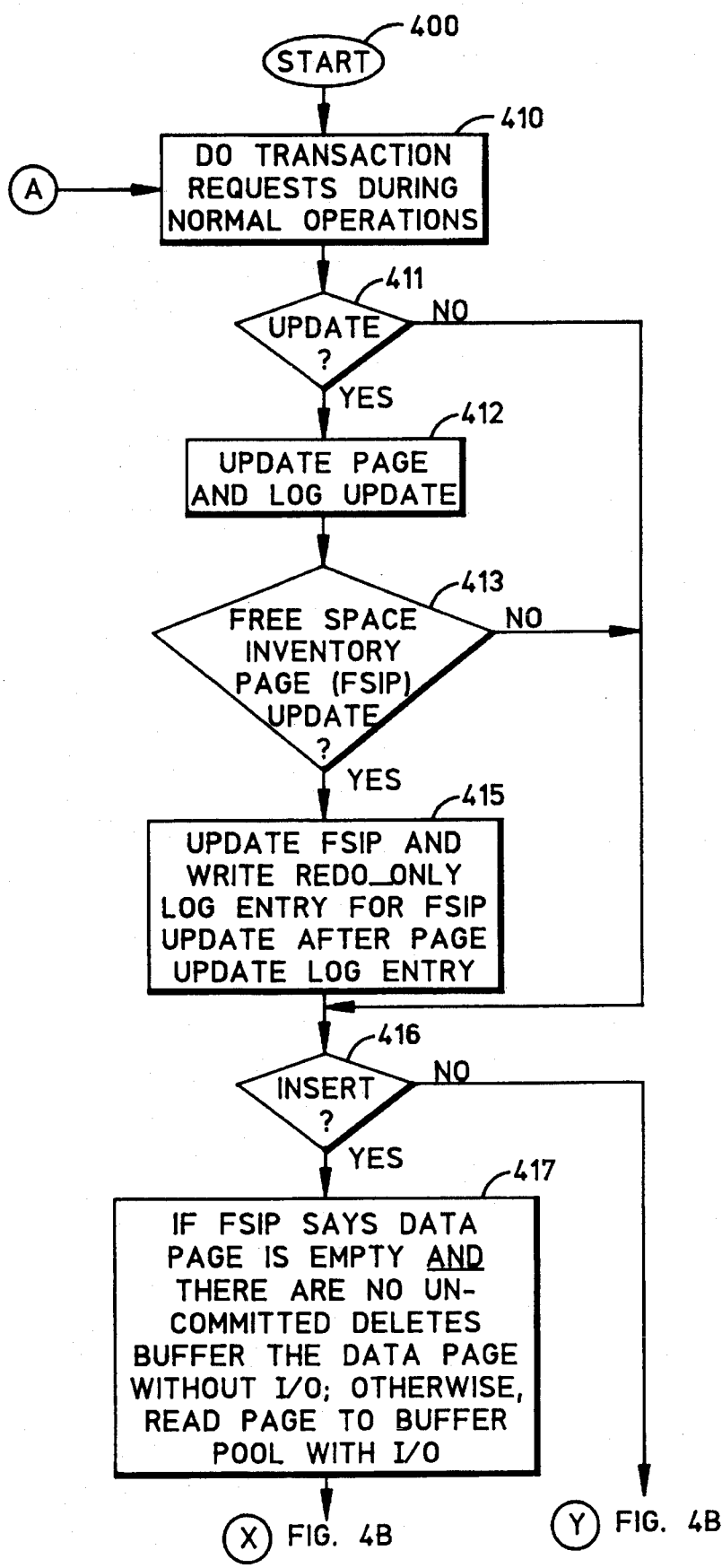
FIG. 4A and 4B comprise a flow chart of a preferred method for practicing the invention.
Figure 4B:
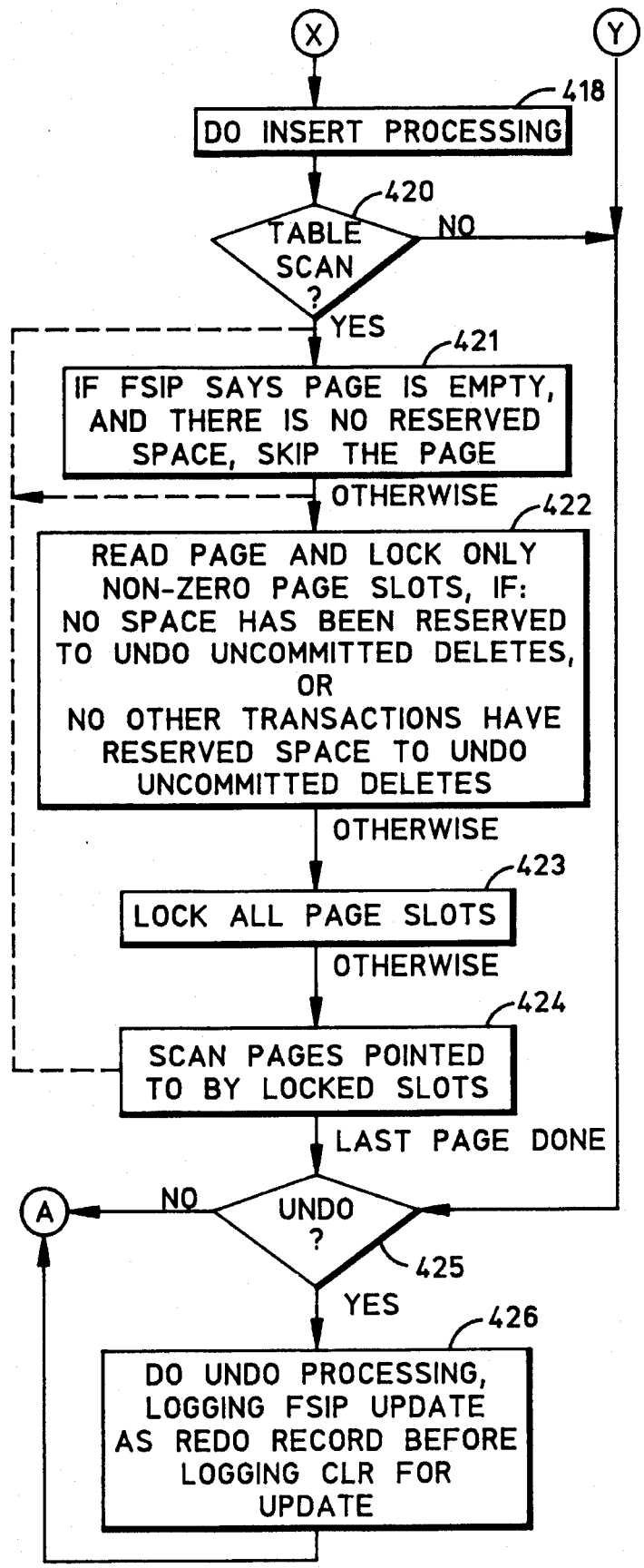

The invention is applied industrially by programmed procedures in a DBMS which are implemented in a record manager such as the record manager 22 or its equivalent in the logical architecture of FIG. 1. FIGS. 4A and 4B form a flow chart illustrating the processing of a record manager vested with programming according to Tables IA, IB, II, and III. During normal transaction activity initiated in step 400, transaction requests are received and evaluated by the record manager. If an update is requested in step 411, the record manager in step 412 ensures that the page or pages are buffered and updated and that the updates are logged. In decision 413, the record manager decides whether space inventory data in the relevant FSIP must be updated. If so, the FSIP update is done and logged in step 415 in a REDO-only log entry after the data page update is logged as described in Table IA. If a transaction request for a record insert is received in step 416, the record manager consults the relevant FSIP containing a space inventory record for the required data page. As set forth in Table II, if the FSIP indicates that the data page is empty and there are no uncommitted deletes for the page, the data page is buffered without I/O services. Otherwise, the page is read into the data buffer pool from stable storage. In step 418, insert processing is executed to insert the data record into the data page buffer. In step 420, the record manager determines whether a cursor stability-level table scan has been requested and executes steps 421–424 for each page required for the scan. Steps 421–423 represent the procedure set forth in Table III. In this regard, in step 421, if the relevant FSIP says that the data page next to be scanned is empty and the request for the instant S-mode reservation lock on the page indicates that no other transaction has reserved space on the page, the page is skipped and the FSIP entry for the next page to be scanned is consulted. Otherwise, in step 422, the page read to the data buffer pool and latched in the buffer pool in S-mode for the transaction. If the Page_LSN and reservation fields indicate that no uncommitted transaction can possibly have uncommitted deletes on the page or if there are possible uncommitted updates on the page but they were performed only by the scanning transaction, only the non-zero ID pointer array slots are locked. Otherwise, all slots are locked in step 423. In step 424, the data records for locked slots are scanned and processing loops back for the next data page. When the last data page has been scanned, the procedure is exited. If, during normal forward processing, or during restart, the need arises to UNDO transaction updates because of a roll back or recovery, the positive exit is taken from decision 425 and the record manager executes the procedure set forth in Table IB. In this case, when a page requires UNDO processing, the update is done to the data page, and a check is made to determine whether the data page's space reservation bits must be updated. If an FSIP update is necessary, it is executed and logged using a REDO-only log record, following which the data page update is logged. Normal processing either continues or recommences at A.

Figure 5:
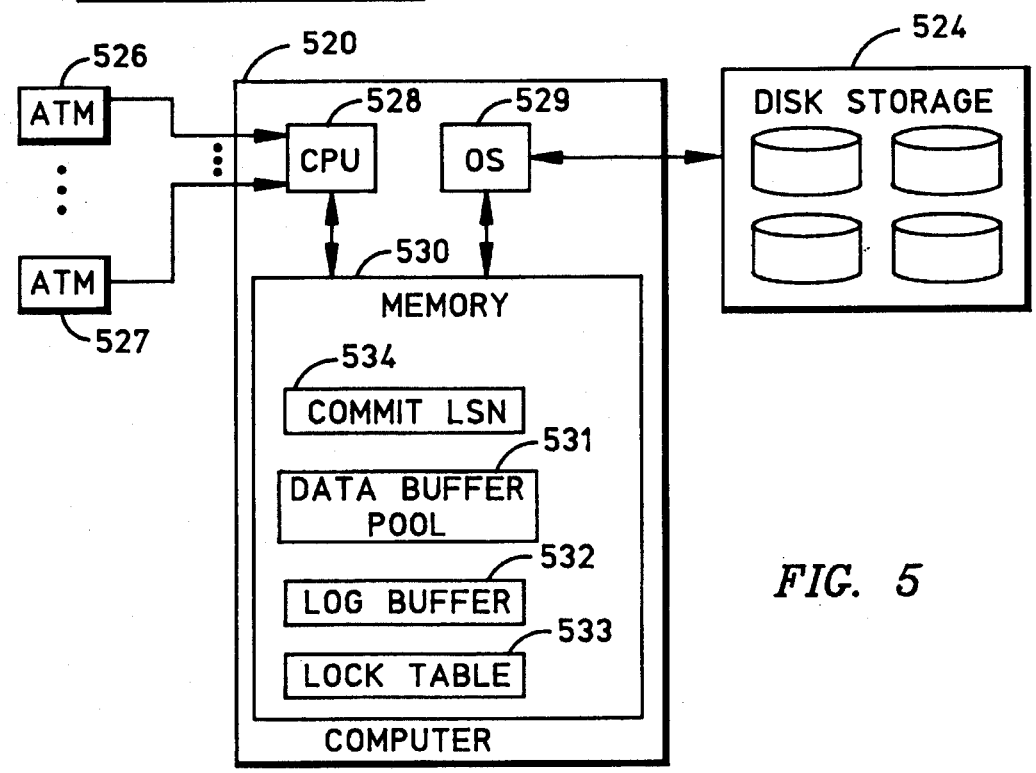
FIG. 5 is a block diagram of physical architecture of a transaction processing system in which the invention may be practiced.

FIG. 5 illustrates a transaction processing system 500 according to this invention. The transaction processing system includes a computer 520 and associated storage 524. The computer 520 communicates with one or more devices such as automated teller machines (ATMs) 526 and 527, which submit transaction requests to the system through the computer 520. The computer 520 may be a general-purpose programmable digital computer; it includes a central processing unit (CPU) 528 for executing database management system programming, an operating system 529, and a main memory 530. Data is retained in the main memory 530 only until it is no longer needed, or until a system shutdown erases the memory. Data is stored permanently in the storage 524 and transferred into the memory 530 when it is needed to be read or updated.

The storage 524 is a general purpose direct access storage device (DASD). The storage 524 stores a log and a database structrued as described above. The main memory 530 is where the buffers 531 and 532 and the table 533 of the DBMS are retained during DBMS processing. In addition, the Commit_LSN 534 is maintained in the main memory 530 and updated therein by the DBMS according to known methods.

While only certain preferred features of this invention have been shown by way of illustration, many changes and modifications will occur to those skilled in the art. Accordingly, it is to be understood that the appended claims are intended to cover all such modifications and changes that fall within the true spirit and scope of the invention.

We claim:

1. In a computer system for executing a database management program which performs operations on data stored in a database in response to transaction requests, the database having a structure in which data records are contained in pages and the pages are organized into groups, where each group includes a plurality of data pages and a free space inventory page (FSIP) containing space inventory records, each space inventory record indicating an mount of free space in a respective data page of the group, the computer system including a data storage facility, a main memory, an operating facility for transferring data between the data storage facility and the main memory, the database management program including a record manager for managing allocation of space in the pages, a log, and a log manager for entering records of updates to the data of the database into the log, a method, executed by the computer system, for updating free space inventory pages, the method including the steps of:

receiving a transaction request to update a data page;

entering the data page and an FSIP containing a space inventory record for the data page into the main memory;

updating the data page in the main memory and entering an update record of the data page update into the log; followed by, determining whether the update to the data page requires changing a space inventory record for the data page in the FSIP; and if required, updating the space inventory record in the FSIP and entering into the log a REDO-only entry of the update to the space inventory record after the update record in the log.

2. In a computer system for executing a database management program which performs operations on data stored in a database in response to transaction requests, the database having a structure in which data records are contained in pages and the pages are organized into groups, where each group includes a plurality of data pages and a free space inventory page (FSIP) containing space inventory records, each space inventory record indicating an amount of free space in a respective data page of the group, the computer system including a data storage facility, a main memory, an operating facility for transferring data between the data storage facility and the main memory, the database management program including a data record manager for managing the allocation of space in the pages, a log, and a log manager for entering records of updates to data of the database into the log, a method executed by the computer system for updating free space inventory pages, the method including the steps of:

starting either a transaction rollback or a recovery process in which an update to a data page must be undone;

entering the data page and an FSIP containing a space inventory record for the data page into the main memory;

UNDOING the update to the data page, followed by;

determining whether the UNDOING step requires changing a space inventory record for the data page in the FSIP; and if the UNDOING step requires changing the space inventory record, performing the update to the space inventory record in the FSIP and entering into the log a REDO-only entry of the update; followed by entering a only entry of the UNDOING step in the log after the REDO record of the update to the space inventory.

3. In a computer system for executing a database management program which performs operations on data stored in a database in response to transaction requests, the database having a structure in which data records are contained in pages and the pages are organized into groups, where each group includes a plurality of data pages and a free space inventory page (FSIP) containing space inventory records, each space inventory record indicating an amount of free space in a respective data page of the group, the computer system including a data storage facility, a main memory, an operating facility for transferring data between the data storage facility and the main memory, the database management program including a record manager for managing allocation of space in the pages, a log, and a log manager for entering records of updates to the data of the database into the log, a method, executed by the computer system, for processing transaction requests, the method including the steps of:

receiving a transaction request to update a first data page;

entering the first data page and an FSIP containing a space inventory record for the data page into the main memory;

updating the first data page in the main memory and entering a record of the first data page update into the log; followed by, determining whether the update to the first data page requires changing a space inventory record for the first data page in the FSIP; and if required, updating the space inventory record in the FSIP and entering into the log a REDO-only entry of the update to the space inventory record after the record of the first data page update;

starting either a roll back of a second transaction or a recovery process in which an update to a second data page must be undone;

entering the second data page and an FSIP containing a space inventory record for the second data page into the main memory;

UNDOING an update of the second data page, followed by;

determining whether the UNDOING step requires changing a space inventory record for the data page in the FSIP; and if the UNDOING step requires changing the space inventory record, performing the update to the space inventory record in the FSIP and entering into the log a REDO-only entry of the update; followed by, entering a record of the UNDOING step in the log after the REDO record of the update to the space inventory record.

4. The method of claim 3 wherein the computer system further includes a lock manager for issuing locks on data objects in the database, the method further including the steps of:

receiving a transaction request for inserting a data record into a third data page;

entering an FSIP containing a space inventory record for the third data page into the main memory;

if the space inventory record indicates that the third data page is empty, and there are no pending uncommitted deletions of data records from the third data page, formatting the third data page in the main memory and inserting the data record into the third data page; otherwise, entering the third data page into the main memory from the data storage apparatus and inserting the data record into the third data page.

5. The method of claim 4 wherein each data page includes at least one space reservation field for indicating when transactions reserve space on a data page and an array of record identification (RID) slots, each of which is either empty or contains a pointer to a data record on the data page, each data page further including a first identifier identifying the last committed update of the data page, the system maintaining a second identifier identifying the latest uncommitted update of the data record in the database, the method further including the steps of:

receiving a transaction request for scanning a data table of the database, the data table including a sequence of data records contained in a plurality of data pages for which space inventory records exist in at least one FSIP;

entering an FSIP into the main memory;

identifying a fourth data page to be scanned in the plurality of data pages for which the FSIP contains space inventory records;

if the space inventory record indicates that the fourth data page is empty, requesting an instant lock for a space reservation field in the fourth data page;

if the instant lock indicates that no other request for itself has been made, identifying a fifth data page to be scanned following the fourth data page, without reading data records on the fourth data page; otherwise, transferring the fourth data page to the main memory from the data storage facility;

comparing the first identifier on the fourth data page with the second identifier to determine whether there are any uncommitted updates on the fourth data page;

if there are no uncommitted updates on the fourth data page and the space reservation field on the fourth data page indicates there are no reserved space on the fourth data page, locking only non-empty slots of the RID pointer array on the fourth data page and scanning the corresponding data records on the fourth data page; otherwise, if there is reserved space on the fourth data page, requesting the instant lock on the space reservation field of the fourth data page;

receiving a grant of the lock determining from the grant of the lock whether uncommitted deletions of data records have been made on the fourth data page;

if uncommitted deletions of data records have been made from the fourth data page only by the transaction, locking only the non-empty slots of the RID pointer array and reading the corresponding data records; otherwise, locking all slots of the RID pointer array and reading the corresponding data records.

* * * * *

UNITED STATES PATENT AND TRADEMARK OFFICE
CERTIFICATE OF CORRECTION

PATENT NO. : 5,455,944
DATED : October 3, 1995
INVENTOR(S) : Haderle et al

It is certified that error appears in the above-indentified patent and that said Letters Patent is hereby corrected as shown below:

Column 15, line 24, delete "only entry" and insert therefor --record--;
           line 25, please delete "record" and insert therefor --only entry--.

Column 17, line 3, insert --and-- between "lock" and "determining".

Signed and Sealed this

Twelfth Day of March, 1996

Attest:

BRUCE LEHMAN

*Attesting Officer*         *Commissioner of Patents and Trademarks*